(12) United States Patent
Poon et al.

(10) Patent No.: US 9,766,464 B2
(45) Date of Patent: Sep. 19, 2017

(54) REDUCING GHOST IMAGES

(71) Applicants: Yarn Chee Poon, Redmond, WA (US); Ian Nguyen, Renton, WA (US); Eliezer Glik, Seattle, WA (US); Tapani Levola, Tampere (FI)

(72) Inventors: Yarn Chee Poon, Redmond, WA (US); Ian Nguyen, Renton, WA (US); Eliezer Glik, Seattle, WA (US); Tapani Levola, Tampere (FI)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 36 days.

(21) Appl. No.: 14/973,150

(22) Filed: Dec. 17, 2015

(65) Prior Publication Data

US 2017/0176745 A1    Jun. 22, 2017

(51) Int. Cl.
*G02B 27/01* (2006.01)
*F21V 8/00* (2006.01)
(Continued)

(52) U.S. Cl.
CPC ....... *G02B 27/0172* (2013.01); *G02B 5/3083* (2013.01); *G02B 6/0016* (2013.01);
(Continued)

(58) Field of Classification Search
CPC  G02B 27/0172; G02B 5/3083; G02B 6/0016; G02B 27/0018; G02B 27/283;
(Continued)

(56) References Cited

U.S. PATENT DOCUMENTS 3,183,459 A    5/1965  Caputo et al.
4,657,348 A    4/1987  Ziegler
(Continued)

FOREIGN PATENT DOCUMENTS

WO    WO2015078788 A1    6/2015

OTHER PUBLICATIONS

Kozlov, et al., "Bragg Reflection Waveguide: Anti-Mirror Reflection and Light Slowdown", In Journal of Optics and Spectroscopy, vol. 110, Issue 3, Mar. 2011, pp. 1-17.
(Continued)

*Primary Examiner* — Frank Font
(74) *Attorney, Agent, or Firm* — Vierra Magen Marcus LLP

(57) ABSTRACT

In a near-eye or heads-up display system including a display engine and an optical waveguide, a quarter-wave retarder (QWR) is positioned between a polarizing beam splitter (PBS) of the display engine and an input diffraction grating of the waveguide. Additionally, a linear polarizer can be positioned between the PBS and the QWR. Light corresponding to an image generated by a reflective microdisplay of the display engine is diffracted into the waveguide by the input diffraction grating, so it can travel by way of total internal reflection to an output coupler and viewed by a human eye. The QWR alone, or in combination with the linear polarizer, prevents a ghost image that may otherwise occur if a portion of the light corresponding to the image, that is diffracted into the waveguide by the input diffraction grating, is diffractively out-coupled by the input diffraction grating and thereafter reflects off the reflective microdisplay.

20 Claims, 4 Drawing Sheets

(51) Int. Cl.
*G02B 5/30* (2006.01)
*G02B 27/28* (2006.01)
*G02B 27/00* (2006.01)

(52) U.S. Cl.
CPC ....... *G02B 27/0018* (2013.01); *G02B 27/283* (2013.01); *G02B 27/286* (2013.01); G02B 2027/012 (2013.01); G02B 2027/0125 (2013.01)

(58) Field of Classification Search
CPC ............ G02B 27/286; G02B 2027/012; G02B 2027/0121; G09G 3/26; G09G 5/00
USPC ............. 359/489.07, 630, 633, 900; 385/37; 345/8
See application file for complete search history.

(56) References Cited

U.S. PATENT DOCUMENTS

| | | | |
|---|---|---|---|
| 5,268,775 A | 12/1993 | Zeidler | |
| 5,481,384 A * | 1/1996 | Kramer | G02B 26/106 359/17 |
| 5,585,946 A | 12/1996 | Chern | |
| 5,936,493 A | 8/1999 | Hulderman et al. | |
| 6,043,896 A | 3/2000 | Scheps | |
| 6,557,999 B1 | 5/2003 | Shimizu | |
| 7,120,309 B2 | 10/2006 | Garcia | |
| 8,189,263 B1 | 5/2012 | Wang et al. | |
| 8,432,614 B2 * | 4/2013 | Amitai | G02B 6/0055 345/8 |
| 8,436,997 B2 | 5/2013 | Brunfeld et al. | |
| 2005/0264818 A1 | 12/2005 | Gollier | |
| 2008/0151379 A1 * | 6/2008 | Amitai | G02B 6/0055 359/630 |
| 2008/0278812 A1 | 11/2008 | Amitai | |
| 2010/0195006 A1 | 8/2010 | Iwai et al. | |
| 2011/0019250 A1 * | 1/2011 | Aiki | G02B 5/32 359/15 |
| 2011/0109528 A1 | 5/2011 | Mun et al. | |
| 2012/0299764 A1 * | 11/2012 | Haneda | G01S 17/42 342/54 |
| 2013/0108229 A1 * | 5/2013 | Starner | G02B 27/01 385/119 |
| 2014/0347572 A1 | 11/2014 | Liu et al. | |
| 2016/0011353 A1 * | 1/2016 | Escuti | G02B 27/283 359/15 |
| 2016/0041387 A1 * | 2/2016 | Valera | G02B 27/0081 385/36 |
| 2016/0131912 A1 * | 5/2016 | Border | G02B 27/0176 345/8 |

OTHER PUBLICATIONS

International Search Report and Written Opinion mailed Mar. 3, 2017, in International Application No. PCT/US2016/064515 filed Dec. 2, 2016.

* cited by examiner

REDUCING GHOST IMAGES

BACKGROUND

Various types of computing, entertainment, and/or mobile devices can be implemented with a transparent or semi-transparent display through which a user of a device can view the surrounding environment. Such devices, which can be referred to as see-through, mixed reality display device systems, or as augmented reality (AR) systems, enable a user to see through the transparent or semi-transparent display of a device to view the surrounding environment, and also see images of virtual objects (e.g., text, graphics, video, etc.) that are generated for display to appear as a part of, and/or overlaid upon, the surrounding environment. These devices, which can be implemented as head-mounted display (HMD) glasses or other wearable near eye display devices, but are not limited thereto, often utilize optical waveguides to replicate an image, e.g., produced by a display engine, to a location where a user of a device can view the image as a virtual image in an augmented or virtual reality environment. Similarly, a display engine and an optical waveguide can also be used to provide a heads up display. As this is still an emerging technology, there are certain challenges associated with utilizing optical waveguides to display images of virtual objects to a user.

SUMMARY

Certain embodiments described herein are directed to a near-eye or heads-up display system that includes a display engine and an optical waveguide. The display engine, which can include a reflective microdisplay, can be configured to produce an image. The optical waveguide, which can include an input diffraction grating and an output coupler, can be configured to cause at least a portion of light corresponding to an image, that is diffracted into the waveguide by the input diffraction grating, to travel by way of total internal reflection (TIR) to the output coupler where the portion of the light corresponding to the image is coupled out of the waveguide so that the image can be viewed by a human eye. The display engine can include a polarizing beam splitter (PBS) configured to transmit linearly polarized light having a first (e.g., P) linear polarization state and reflect linearly polarized light having a second (e.g., S) linear polarization state that is orthogonal to the first linear polarization state. The PBS of the display engine can be positioned relative to the optical waveguide to cause linearly polarized light corresponding to the image and having the first linear polarization state to be directed toward the input diffraction grating of the optical waveguide, wherein the first linear polarization state is one of the P and S linear polarization states. The input diffraction grating of the optical waveguide can be configured to diffract light corresponding to the image, that is incident on the input diffraction grating, into the optical waveguide.

The system can additionally include a quarter-wave retarder (QWR) positioned between the PBS of the display engine and the input diffraction grating of the optical waveguide. The system may also include a linear polarizer positioned between the PBS of the display engine and the QWR. The QWR alone, or in combination with the linear polarizer, can be used to prevent a ghost image that may otherwise occur if a portion of the light corresponding to the image, that is diffracted into the waveguide by the input diffraction grating, is diffractively out-coupled by the input diffraction grating and thereafter reflects off the reflective microdisplay of the display engine.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
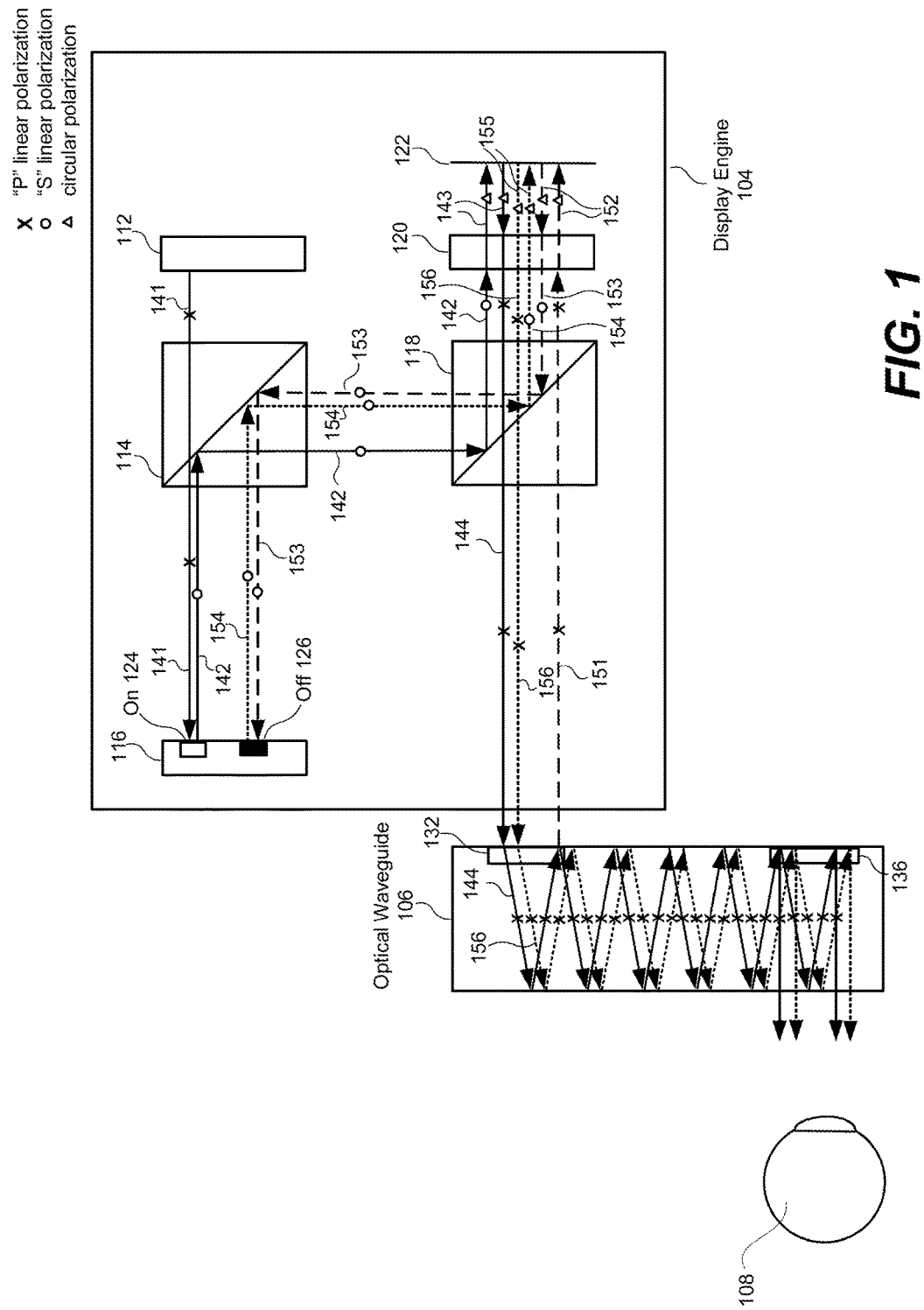
FIG. 1, which illustrates an exemplary display system, is used to show how undesirable ghost images may occur.

FIG. 1 illustrates an exemplary display system (e.g., a near-eye or heads-up display system) that includes a display engine 104 and an optical waveguide 106. The display engine 104 is shown as including a light source assembly 112, a polarizing beam splitter (PBS) 114, a reflective microdisplay 116, a polarizing beam splitter (PBS) 118, a quarter wave retarder (QWR) 120 and a mirror 122. While the PBSs 114 and 118 are illustrated as PBS cubes, the PBS 114 can alternatively be implemented as a PBS plate, and/or the PBS 118 can be implemented as a PBS plate. The display engine 104 can include additional and/or alternative components. Further, the precise locations of the various (and/or additional and/or alternative) components can be changed, depending upon implementation.

The optical waveguide 106 is shown as including an input coupler 132 and an output coupler 136. In accordance with certain embodiments of the present technology described herein, the input coupler 132 is a diffraction grating, and thus, can also be referred to as an input diffraction grating 132.

A diffraction grating is an optical component that may contain a periodic structure that causes incident light to split and change direction due to an optical phenomenon known as diffraction. The splitting (known as optical orders) and angle change depend on the characteristics of the diffraction grating. When the periodic structure is on the surface of an optical component, it is referred to a surface grating. When the periodic structure is due to varying of the surface itself, it is referred to as a surface relief grating (SRG). For example, an SRG can include uniform straight grooves in a surface of an optical component that are separated by uniform straight groove spacing regions. Groove spacing regions can be referred to as "lines", "grating lines" or "filling regions". The nature of the diffraction by an SRG depends on the wavelength, polarization and angle of light incident on the SRG and various optical characteristics of the SRG, such as refractive index, line spacing, groove depth, groove profile, groove fill ratio and groove slant angle. An SRG can be fabricated by way of a suitable microfabrication process, which may involve etching of and/or deposition on a substrate to fabricate a desired periodic microstructure on the substrate to form an optical component, which may then be used as a production master such as a mold or mask for manufacturing further optical components. An SRG is an example of a Diffractive Optical Element (DOE). When a DOE is present on a surface (e.g. when the DOE is an SRG), the portion of that surface spanned by that DOE can be referred to as a DOE area. A diffraction grating, instead of being a surface grating, can alternatively be a volume grating, such as a Bragg diffraction grating. The input diffraction grating 132 can be, e.g., a surface diffraction grating, or a volume diffraction grating, or a hybrid of a surface and volume diffraction grating. In accordance with embodiments described herein, each diffraction grating can have a preferential linear polarization orientation specified by a direction of the grating lines of the diffraction grating, wherein the coupling efficiency for light having the preferential linear polarization orientation will be higher than for light having a non-preferential linear polarization orientation.

The light source assembly 112 can include, e.g., red, green and blue light sources that respectively emit red, green and blue light. The light source 112 assembly can additionally include beam combining optical elements, such as dichroic filters, and one or more collimating lenses, which are not shown. The light source assembly 112 produces light that is reflected off the reflective microdisplay 116 to produce an image. Light corresponding to the image, produced by the reflective microdisplay 116, is eventually incident on the input diffraction grating 132, which couples the light corresponding to the image into the optical waveguide. At least a portion of the light (corresponding to the image) that is coupled into the optical waveguide 106 travels, by way of total internal reflection (TIR), from the input diffraction grating 132 to the output coupler 136, where the light (corresponding to the image) is coupled out of the optical waveguide 106 so that the image can be viewed by a human eye 108.

As indicated in the legend in FIG. 1 (and the legends in FIGS. 2 and 3), a light ray denoted with an "X" is linearly polarized light having the "P" polarization state, a light ray denoted with a "O" is linearly polarized light having the "S" polarization state, and a light ray denoted with a "Δ" is circularly polarized light. Linearly polarized light having the P polarization state, and linearly polarized light having the S polarization state, have orthogonal polarization states relative to one another. Linearly polarized light having the P polarization state can also be referred to herein as P linearly polarized light. Linearly polarized light having the S polarization state can also be referred to herein as S linearly polarized light.

In the embodiment of FIG. 1, the PBS 114 is configured to transmit P linearly polarized light, and reflect S linearly polarized light. Similarly, the PBS 118 is configured to transmit P linearly polarized light, and reflect S linearly polarized light.

The reflective microdisplay 116 can be, e.g., a liquid crystal on silicon (LCoS) microdisplay, which includes a reflective display surface including pixels that can be in an "on" state or an "off" state, as controlled by electronics (not shown). Light beams that are incident on the reflective microdisplay 116 are reflected and the polarization state of the reflected light beams depends on the state of the pixels. For the purpose of this discussion, it is assumed that the reflective microdisplay 116 is designed such that light beams that reflect off pixels that are in the "on" state have their linear polarization state rotated by ninety degrees, and that light beams that reflect off pixels that are in the "off" state reflect with their linear polarization state unaffected. Thus, if P linearly polarized light reflects off an "on" pixel, the reflected light will be S linearly polarized due to the polarization state being rotated by ninety degrees. In FIG. 1 (and other FIGS.), an "on" pixel 124 and an "off" pixel 126 are represented. However, it should be understood that while only two pixels 124 and 126 are represented, the reflective microdisplay 116 will likely include thousands or millions of pixels arranged in a two dimensional array, with each pixel being individually controlled to be in either the its "on" state or its "off" state.

When light travels through the QWR 120, the QWR 120 converts linearly polarized light to circularly polarized light, and vice versa. If linearly polarized light of one state travels through a QWR (e.g., 120) twice, it gets converted to the other linearly polarized state. For example, if S linearly polarized state travels through a QWR (e.g., 120) it gets converted to circularly polarized light. If that circularly polarized light, e.g., after reflecting off a mirror (e.g., 122) thereafter travels through a QWR (e.g., 120), it then gets converted to P linearly polarized light.

In FIG. 1, and other FIGS., when light is reflected back in the same direction from which the light came, the reflected light is shown as having an exaggerated linear displacement, so that light that is incident on the reflective surface is distinguishable (for discussion and illustrative purposes) from the light that is reflected from the reflective surface. For example, the reflected light beam 142 is shown as being vertically displaced from the incident light beam 141. In reality, the reflected light beam 142, if drawn accurately, may actually completely overlap the incident light beam 141. However, because it would be difficult to draw overlapping beams that are distinguishable from one another, beams 142 and 141 are shown as being linearly displaced from one another. For another example, the light beam labeled 143 (having an arrowhead pointed to the right) that is incident on the mirror 122, and the reflected light beam also labeled 143 that is reflected off the mirror 122 (having an arrowhead pointed to the left), may actually completely overlap one another, but were drawn as being linearly displaced from one another so that the light beam 143 incident on the mirror 122 is distinguishable from the light beam 143 reflected from the mirror 122.

The solid arrowed line labeled 141 is illustrative of a ray of light that is emitted by the light source assembly 112 and is incident on the reflective microdisplay 116. In the example shown in FIG. 1, the ray of light 141 is shown as being P linearly polarized light that is transmitted by the PBS 114 (i.e., passes through the PBS 114) and reflects off a pixel 124 of the reflective microdisplay 114 that is in the "on" state. The reflective microdisplay 114 is shown as converting the P linearly polarized light to S linearly polarized light 142 (by rotating the polarization vector by 90 degrees), and directing the S linearly polarized light 142 towards the PBS 114. The S linearly polarized light 142 is reflected by the PBS 114 towards the PBS 118. The PBS 118 reflects the S linearly polarized light 142 towards the QWR 120. The QWR 120 converts the S linearly polarized light 142 to circularly polarized light 143. The circularly polarized light 143 is reflected by the mirror 122 back towards the QWR 120, which converts the circularly polarized light 143 to P linearly polarized light 144. The P linearly polarized light 144 is shown as being transmitted by the PBS 118 (i.e., passing through the PBS 118), exiting the display engine 104, and being incident on the input diffraction grating 132.

The input diffraction grating 132 diffracts the P linearly polarized light 144 into the optical waveguide 106. In the example of FIG. 1, the P linearly polarized light 144, after being diffracted into the optical waveguide 106, and experiencing an internal reflection, is shown as being again incident on the input diffraction grating 132, where a portion of the P linearly polarized light 144, represented by the dashed line 151, is diffracted out of the optical waveguide 106 and directed back into the display engine 104 towards the PBS 118. More specifically, a portion of the P linearly polarized light, after internally reflecting off a surface of the optical waveguide 106, is diffracted out of the optical waveguide 106 by the input diffraction grating 132 towards the PBS 118. In other words, the P linearly polarized light, represented by the dashed line 151, is light that is undesirably diffractively out-coupled by the input diffraction grating 132 back into the display engine 104. A further portion of the P linearly polarized light 144 (which is not diffractively out-coupled by the input diffraction grating 132) travels, by way of TIR, to the output coupler 136 where the light (corresponding to the image) is coupled out of the optical waveguide 106 so that the image can be viewed by the human eye 108.

The diffractively out-coupled P linearly polarized light 151 is shown as being transmitted by the PBS 118 (i.e., passing through the PBS 118), and then passing through the QWR 120, which converts the P linearly polarized light 151 to circularly polarized light 152. The circularly polarized light 152 is reflected by the mirror 122 back towards the QWR 120, which converts the circularly polarized light 152 to S linearly polarized light 153. The PBS 118 reflects the S linearly polarized light 153 towards the PBS 114, which reflects the S linearly polarized light 153 back towards the reflective microdisplay 116. The S linearly polarized light 153 is shown as being incident on a pixel 126 of the reflective microdisplay 116 that is in the "off" state, and thus, the reflected light 154 remains in S linearly polarized light. The S linearly polarized light 154 is reflected by the PBS 114 towards the PBS 118, which reflects the S linearly polarized light 154 toward the QWR 120. The QWR 120 converts the S linearly polarized light 154 to circularly polarized light 155. The circularly polarized light 155 is reflected by the mirror 122 back towards the QWR 120, which converts the circularly polarized light 155 to P linearly polarized light 156. The P linearly polarized light 156 is shown as being transmitted by the PBS 118 (i.e., passing through the PBS 118), exiting the display engine 104, and being incident on the input diffraction grating 132. The P linearly polarized light 156, which is represented as a dotted line, is then shown as traveling, by way of TIR, to the output coupler 136 where the P linearly polarized light 156 is coupled out of the optical waveguide 106 and viewable by the human eye 108 as an undesirable ghost image. Such a ghost image is essentially a replica of the desired image that is offset in position and super imposed on top of the desired image.

One potential solution for eliminating (or at least mitigating) ghost images would be to tilt the optical waveguide 106 relative to the display engine 104, such that that light that is undesirably diffractively out-coupled from the optical waveguide 106 by the input diffraction grating 132 (such as the light represented by the dashed line 151) is out-coupled at such an angle, relative to the display engine 104, that the light does not make it back to the reflective microdisplay 116. However, there are limitations to that solution. More specifically, tilting the optical waveguide 106 relative to the display engine 104 can have the undesirable effect of limiting the field of view (FOV) that can be achieved. Further, tilting the optical waveguide 106 relative to the display engine 104 can adversely affect the form factor and/or industrial design of the resulting display system, which may be very important where the display system is, for example, a head mounted near eye display system. Additionally, there is only so far that the optical waveguide 106 can be tilted relative to the display engine 104 before the input diffraction grating 132 will no longer meet design constraints and TIR requirements.

Figure 2:
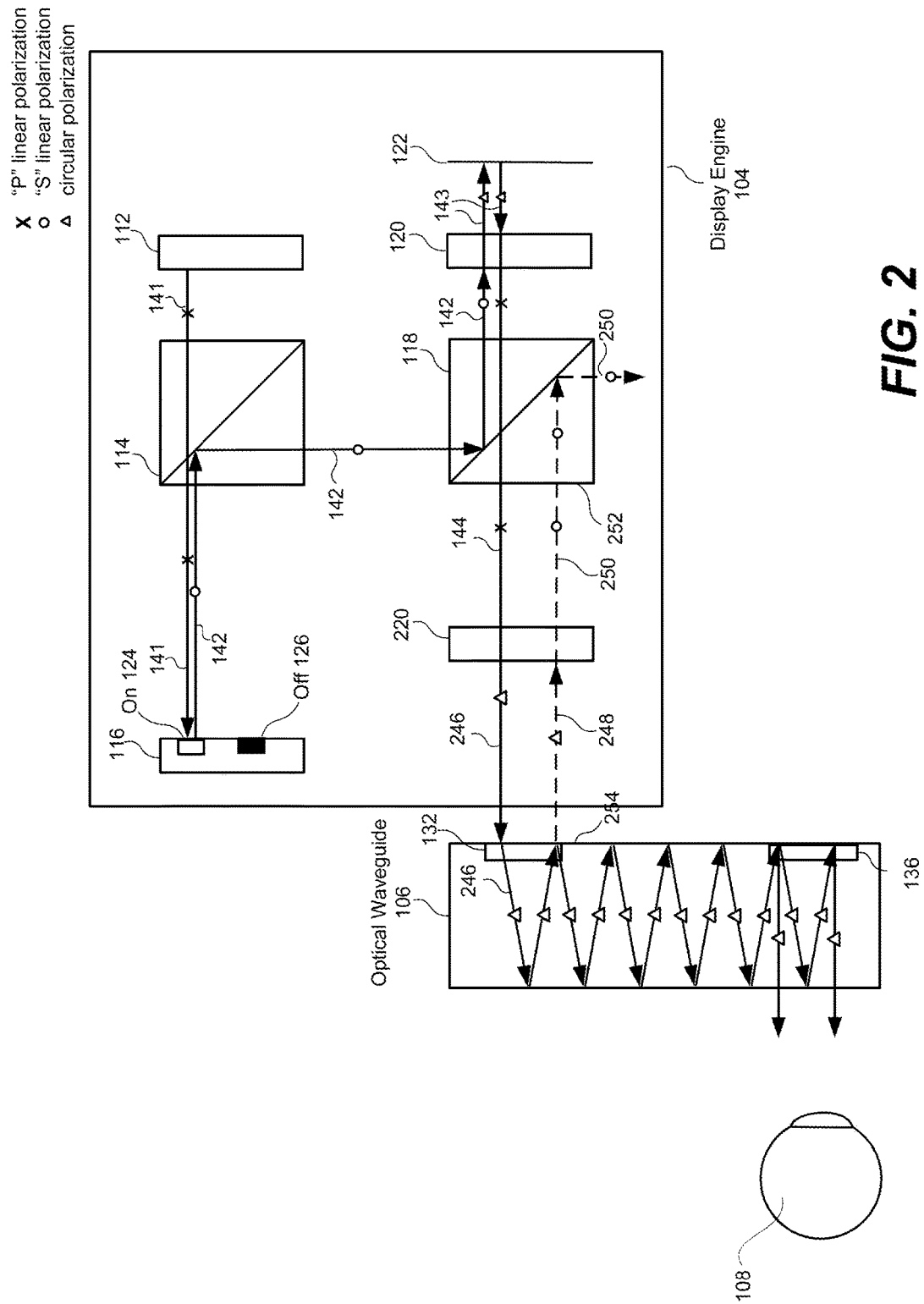
FIG. 2 illustrates an exemplary display system that is configured to reduce or eliminate ghost images in accordance with an embodiment of the present technology.

Embodiments of the present technology, which are described below, provide for a more eloquent solution for eliminating (or at least mitigating) the above described ghost images. One such embodiment will first be described with reference to FIG. 2. In FIG. 2, components that are the same as in FIG. 1 are labeled the same, and thus, need not be described again. Similarly, arrowed lines representing polarized light that are the same in FIG. 2, as they are in FIG. 1, are labeled the same, and thus, need not be described again.

A comparison between FIG. 1 and FIG. 2 shows that in FIG. 2 a QWR 220 is added so that the P linearly polarized light 144, after being transmitted by the PBS 118 (i.e., after passing through the PBS 118) travels through the QWR 220 before being incident on the input diffraction grating 132 of the optical waveguide 106. The added QWR 220 causes the P linearly polarized light 144 to be converted to circularly polarized light 246. The circularly polarized light 246 is shown as being incident on the input diffraction grating 132.

The input diffraction grating 132 diffracts the circularly polarized light 246 into the optical waveguide 106. In the example of FIG. 2, the circularly polarized light 246, after being diffracted into the optical waveguide 106, and experiencing an internal reflection, is shown as being again incident on the input diffraction grating 132, where a portion of the circularly polarized light 246, represented by the dashed line 248, is diffracted out of the optical waveguide 106 and directed back towards the QWR 220. More specifically, a portion of the circularly polarized light 246, after internally reflecting off a surface of the optical waveguide 106, is diffracted out of the optical waveguide 106 by the input diffraction grating 132 towards the QWR 220. In other words, the circularly polarized light 246, represented by the dashed line 248, is light that is undesirably diffractively out-coupled by the input diffraction grating 132 back towards the QWR 220. A further portion of the circularly polarized light 246 (which is not diffractively out-coupled by the input diffraction grating 132) travels, by way of TIR, to the output coupler 136 where the light (corresponding to the image) is coupled out of the optical waveguide 106 so that the image can be viewed by the human eye 108.

The QWR 220 converts the diffractively out-coupled circularly polarized light 248 to S linearly polarized light 250, which is directed toward the PBS 118. As shown in FIG. 2, the PBS 118 reflects the S linearly polarized light 250 in a direction away from the PBS 114, and more generally, in a direction that prevents that S linearly polarized light 250 from ever reaching the reflective microdisplay 116 and causing a ghost reflection that can cause a ghost image.

While shown as being included within the display engine 104 in FIG. 2, the added QWR 220 can instead be added external to the display engine 104, e.g., between the display engine 104 and the input diffraction grating 132 of the optical waveguide 106. In accordance with an embodiment, the QWR 220 can be implemented as an optical plate made of glass or optical plastic, in which case, the QWR 220 can be more specifically referred to as a quarter wave plate (QWP). In accordance with other embodiments, the QWR 220 can be implemented as a film, in which case, the QWR 220 can be more specifically referred to as a quarter wave film (QWF). For example, the QWR 220 can be implemented as a chromatic single layer polycarbonate film, but is not limited thereto. The QWR 220 can also be implemented as a coating.

If implemented as a film, the QWR 220 can be applied to, and thereby coat, a surface 252 of a PBS cube, where the PBS 118 is implemented as a PBS cube. Alternatively, if implemented as a film, the QWR 220 can be applied to, and thereby coat, a surface 254 of the optical-waveguide 106 (or a portion of the surface 254) such that the P-linearly polarized light 144 is converted to circularly polarized light 246 before being diffracted into the optical waveguide 106 by the input diffraction grating 132, and such that the portion of the circularly polarized light 246 that is diffractively out-coupled by the input diffraction grating 132 gets converted to S-linearly polarized light 250 before being incident on the PBS 118.

Figure 3:
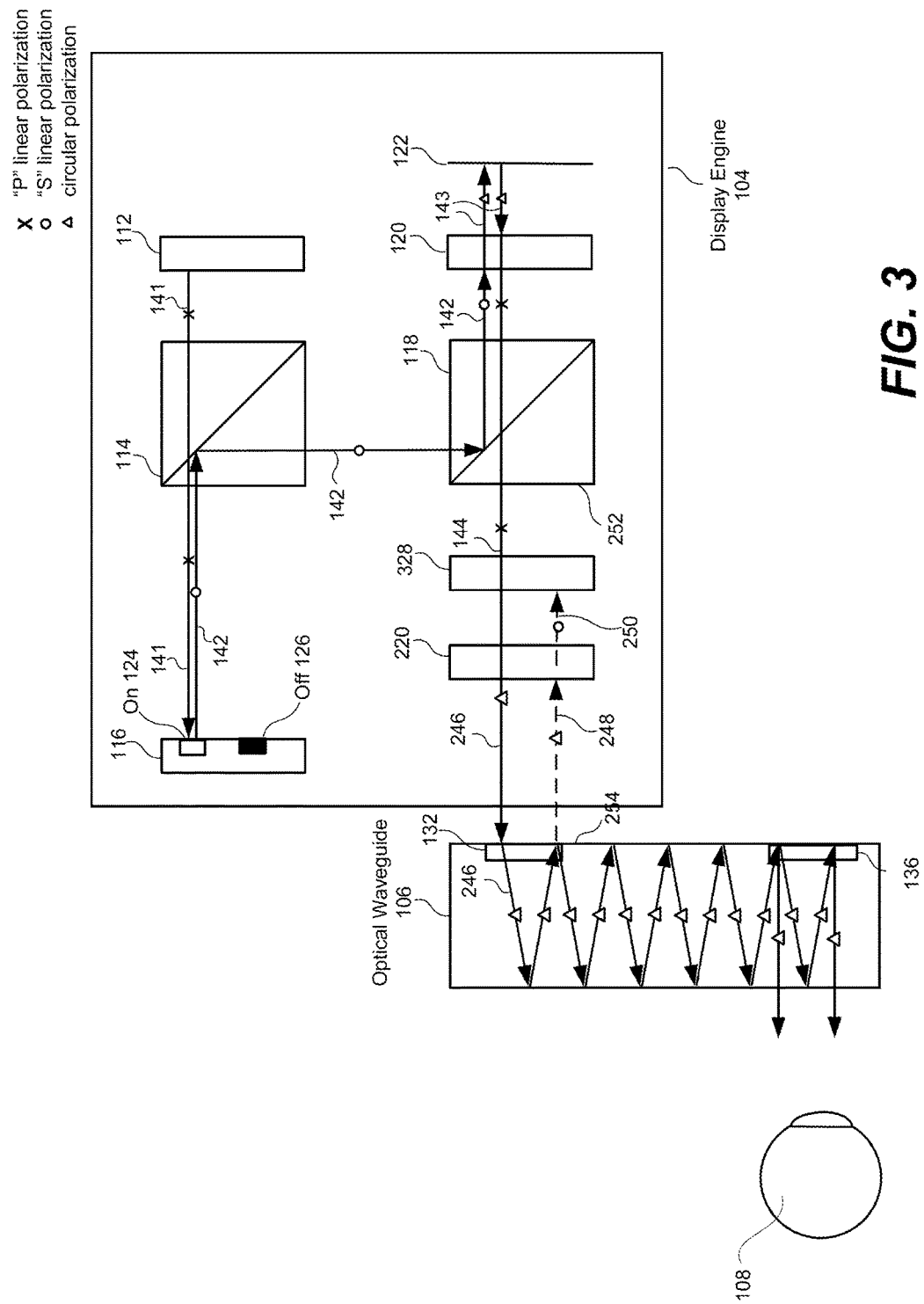
FIG. 3 illustrates an exemplary display system that is configured to reduce or eliminate ghost images in accordance with another embodiment of the present technology.

FIG. 3 will now be used to explain a further embodiment of the present technology that eliminates (or at least mitigating) the ghost images described above with reference to FIG. 1. In FIG. 3, components that are the same as in FIG. 1 or 2 are labeled the same, and thus, need not be described again. Similarly, arrowed lines representing polarized light that are the same in FIG. 3, as they are in FIG. 1 or 2, are labeled the same, and thus, need not be described again.

A comparison between FIG. 3 and FIG. 2 shows that in FIG. 3 a linear polarizer 328 is added between the PBS 118 and the QWR 220. In the specific embodiment shown, the linear polarizer 328 is configured to transmit P linearly polarized light and absorb S linearly polarized light. Since linear polarizer 328 absorbs light of one of the two orthogonal polarization states, the linear polarizer 328 can be referred to more specifically as an absorptive polarizer 328. Referring to FIG. 3, the linear polarizer 328 is shown as transmitting (i.e., passing) the P linearly polarized light 144 that is produced by the display engine 104, before the P linearly polarized light 144 is converted to the circularly polarized light 246, by the QWR 220, and the circularly polarized light 246 is thereafter incident on the input diffraction grating 132. Still referring to FIG. 3, the linear polarizer 328 is also shown as absorbing the S linearly polarized light 250, which corresponds to the diffractively out-coupled light 248 after it has been converted to S linearly polarized light by the QWR 220. In this manner, light that gets diffractively out-coupled from the waveguide 106 is prevented from reaching the PBS 118, and more importantly, is prevented from ever reaching the reflective microdisplay 116 and causing a ghost reflection that can cause a ghost image.

The embodiments of the present technology described above with reference to FIGS. 2 and 3 are counterintuitive because such embodiments rely on injecting circularly polarized light (e.g., 246 in FIGS. 2 and 3) into an optical waveguide (e.g., 106), rather than linearly polarized light (e.g., 144 in FIG. 1). It is conventionally believed to be undesirable to inject circularly polarized light into an optical waveguide via an input diffractive grating, wherein the input diffractive grating has a preferential linear polarization orientation specified by a direction of the grating lines of the input diffractive grating. This is because the coupling efficiency when injecting circularly polarized light into an optical waveguide via such an input diffractive grating can be as much as fifty-percent less than the coupling efficiency when injecting linearly polarized light having the preferential linear polarization into an optical waveguide via such an input diffraction grating. Such losses in coupling efficiency can be compensated for in other manners, e.g., one of which may involve using more powerful light sources.

In the above described embodiments, described with reference to FIGS. 1, 2 and 3, the PBSs 114 and 118 of the display engine 104 were described as directing P linearly polarized light toward the QWR 220. It would also be possible to modify the display engine 104 to use one or more PBSs to direct S linearly polarized light toward the QWR 220. Further, it would also be possible to modify the display engine 104 to use a linear polarizer (in place of the linear polarizer 328) that transmits S linearly polarized light and absorbs P linearly polarized light. More generally, a PBS within the display engine 104 can be positioned relative to the optical waveguide 106 to cause linearly polarized light corresponding to an image and having a first polarization state to be directed toward the input diffraction grating 132 of the optical waveguide 106, wherein the first polarization state is either the S polarization state or the P polarization state. In other words, embodiments of the present technology are not limited to the exact implementations shown in and described with reference to FIGS. 2 and 3.

Figure 4:
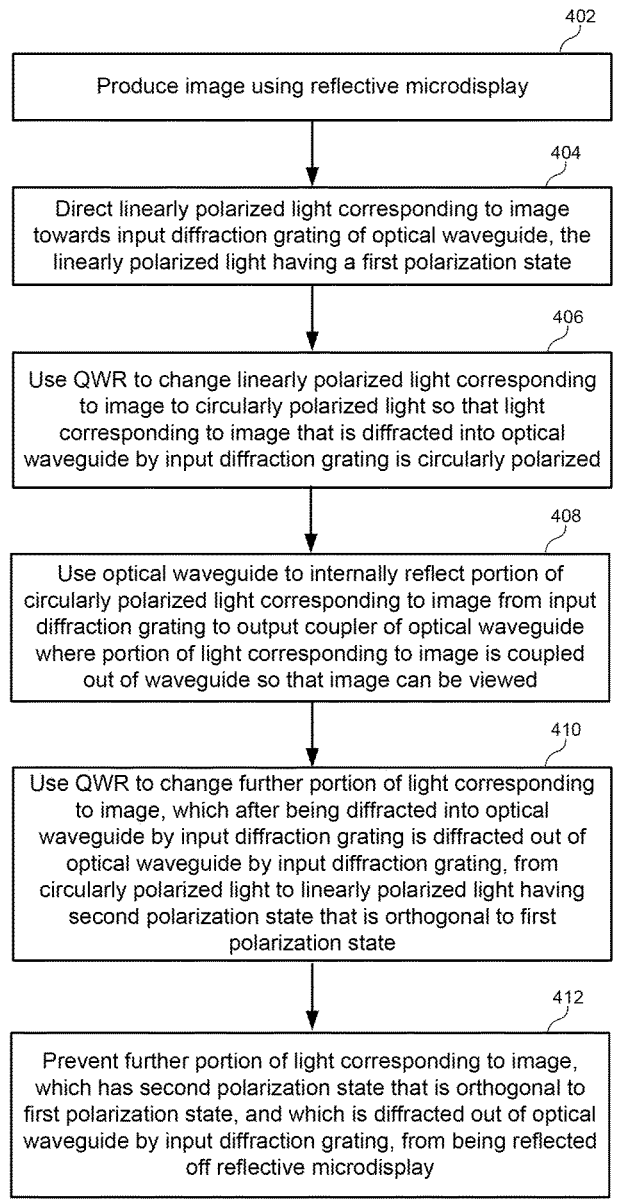
FIG. 4 is a high level flow diagram that is used to summarize methods according to various embodiments of the present technology.

Methods according to embodiments of the present technology, which can be used to reduce and hopefully prevent a ghost image from appearing, will now be summarized with reference to the high level flow diagram of FIG. 4.

Referring to FIG. 4, step 402 involves producing an image using a reflective microdisplay (e.g., 116), such as, but not limited to, an LCoS microdisplay.

Step 404 involves directing linearly polarized light (e.g., 144) corresponding to the image towards an input diffraction grating (e.g., 132) of an optical waveguide (e.g., 106), the linearly polarized light (e.g., 144) having a first polarization state (e.g., P linear polarization).

Step 406 involves using a QWR (e.g., 220) to change the linearly polarized light (e.g., 144) corresponding to the image to circularly polarized light (e.g., 246) so that the light corresponding to the image that is diffracted into the optical waveguide (e.g., 106) by the input diffraction grating (e.g., 132) is circularly polarized.

Step 408 involves using the optical waveguide (e.g., 106) to internally reflect a portion of the circularly polarized light (e.g., 246) corresponding to the image from the input diffraction grating (e.g. 132) to an output coupler (e.g., 136) of the optical waveguide, where the portion of the light corresponding to the image is coupled out of the waveguide so that the image can be viewed by a human eye (e.g., 108).

Step 410 involves using the QWR (e.g., 220) to change a further portion of the light (e.g., 248) corresponding to the image, which after being diffracted into the optical waveguide by the input diffraction grating is diffracted out of the optical waveguide by the input diffraction grating, from circularly polarized light (e.g., 248) to linearly polarized light (e.g., 250) having a second polarization state (e.g., S linear polarization) that is orthogonal to the first polarization state (e.g., P linear polarization).

Step 412 involves preventing the further portion of the light (e.g., 250) corresponding to the image, which has the second polarization state (e.g., S linear polarization) that is orthogonal to the first polarization state (e.g., P linear polarization), and which is diffracted out of the optical waveguide (e.g., 106) by the input diffraction grating (e.g., 132), from being reflected off the reflective microdisplay (e.g., 116).

In accordance with certain embodiments, at step 404, the linearly polarized light corresponding to the image and having a first polarization state (e.g., P linear polarization) is directed towards the input diffraction grating (e.g., 132) of the optical waveguide (e.g. 106) using a PBS (e.g., 118). In specific embodiments discussed above with reference to FIG. 2, step 412 can involve using the PBS (e.g., 118) to reflect the further portion of the light (e.g., 248, 250) corresponding to the image in a direction away from the reflective microdisplay (e.g., 116). In other embodiments discussed above with reference to FIG. 3, step 412 can involves using a linear polarizer (e.g., 328) that is configured to transmit light having the first polarization state (e.g., P linear polarization) and to absorb light having the second polarization state (e.g., S linear polarization).

Certain embodiments described above relate to a near eye or heads up display system that includes a reflective microdisplay, a PBS, a QWR and an optical waveguide. The reflective microdisplay is configured to produce an image. The optical waveguide includes an input diffraction grating and an output coupler. The PBS is positioned to cause linearly polarized light corresponding to the image and having a first polarization state (e.g., P linear polarization) to be directed toward the input diffraction grating of the optical waveguide. The QWR is positioned between the PBS and the input diffraction grating of the optical waveguide so that linearly polarized light corresponding to the image and having the first polarization state, which is transmitted by the PBS toward the input diffraction grating of the optical waveguide, is converted to circularly polarized light before being diffracted into the waveguide by the input diffraction grating of the optical waveguide. The optical waveguide is configured to cause at least a portion of the circularly polarized light corresponding to the image, that is diffracted into the waveguide by the input diffraction grating, to travel by way of TIR to the output coupler where the portion of the light corresponding to the image is coupled out of the waveguide so that the image can be viewed by a human eye. A further portion of the circularly polarized light corresponding to the image, after being diffracted into the optical waveguide by the input diffraction grating, is undesirably diffracted out of the optical waveguide by the input diffraction grating. The QWR, which is positioned between the PBS and the input diffraction grating, will change the diffractively out-coupled light from circularly polarized light to linearly polarized light having the second polarization state (that is orthogonal to the first polarization state).

In accordance with an embodiment, the PBS will reflect, in a direction away from the reflective microdisplay, light corresponding to the image that after being diffracted out of the optical waveguide by the input diffraction grating is converted by the QWR from circularly polarized light to linearly polarized light having the second polarization state that is orthogonal to the first polarization state, thereby preventing a ghost image that may otherwise occur due to the diffracted out light. In accordance with another embodiment, the system also includes a linear polarizer positioned between the PBS and the QWR, wherein the linear polarizer is configured to transmit light having the first polarization state and absorb light having the second polarization state that is orthogonal to the first polarization state. In this latter embodiment, the linear polarizer will transmit the light corresponding to the image and having the first polarization state, that is directed toward the input diffraction grating of the optical waveguide, before the light corresponding to the image and having the first polarization state reaches the QWR. Additionally, the linear polarizer will absorb light corresponding to the image that after being diffracted out of the optical waveguide by the input diffraction grating is converted by the QWR from circularly polarized light to linearly polarized light having the second polarization state that is orthogonal to the first polarization state, thereby preventing a ghost image that may otherwise occur due to the diffracted out light. The first polarization state can be P polarization, and the second polarization can be S polarization. Alternatively, the first polarization state can be S polarization, and the second polarization state can be P polarization.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A near-eye or heads-up display system, comprising:
an optical waveguide including an input diffraction grating and an output coupler;
a display engine configured to produce an image and to direct light corresponding to the image and having a first linear polarization state toward the input diffraction grating of the optical waveguide;
the input diffraction grating of the optical waveguide configured to diffract light corresponding to the image, that is incident on the input diffraction grating, into the optical waveguide; and
a quarter-wave retarder (QWR) positioned within the display engine, or between the display engine and the input diffraction grating of the optical waveguide, so that linearly polarized light corresponding to the image and having the first linear polarization state, which is directed toward the input diffraction grating of the optical waveguide, is converted to circularly polarized light before being diffracted into the optical waveguide by the input diffraction grating;
wherein the QWR will change from circularly polarized light to linearly polarized light having a second linear polarization state that is orthogonal to the first linear polarization state, at least a portion of circularly polarized light corresponding to the image that after being diffracted into the optical waveguide by the input diffraction grating is diffracted out of the optical waveguide by the input diffraction grating.

2. The system of claim 1, wherein:
the display engine includes a reflective microdisplay that is used to produce the image; and
the display engine also includes a polarizing beam splitter (PBS) configured to transmit linearly polarized light having the first linear polarization state, and reflect linearly polarized light having the second linear polarization state that is orthogonal to the first linear polarization state; and
the PBS is positioned within the display engine and relative to the optical waveguide to reflect, in a direction away from the reflective microdisplay, at least a portion of light corresponding to the image that after being diffracted out of the optical waveguide by the input diffraction grating is converted by the QWR from circularly polarized light to linearly polarized light having the second linear polarization state that is orthogonal to the first linear polarization state.

3. The system of claim 2, wherein the system prevents a ghost image that may otherwise be caused if light corresponding to the image, after being diffracted out of the optical waveguide by the input diffraction grating, were reflected off of the reflective microdisplay.

4. The system of claim 1, further comprising:
a linear polarizer configured to transmit light having the first linear polarization state and absorb light having the second linear polarization state that is orthogonal to the first linear polarization state;
wherein the linear polarizer is positioned relative to the QWR to absorb at least a portion of light corresponding to the image that after being diffracted out of the optical waveguide by the input diffraction grating is converted by the QWR from circularly polarized light to linearly polarized light having the second linear polarization state that is orthogonal to the first linear polarization state.

5. The system of claim 4, wherein:
the display engine includes a reflective microdisplay that is used to produce the image; and
the display engine also includes a polarizing beam splitter (PBS) positioned within the display engine and relative to the optical waveguide to cause linearly polarized light corresponding to the image and having the first linear polarization state to be directed toward the input diffraction grating of the optical waveguide;
the QWR is positioned between the PBS of the display engine and the input diffraction grating of the optical waveguide; and
the linear polarizer is positioned between the PBS of the display engine and the QWR.

6. The system of claim 5, wherein the system prevents a ghost image that may otherwise be caused if light corresponding to the image, after being diffracted out of the optical waveguide by the input diffraction grating, were reflected off of the reflective microdisplay.

7. The system of claim 1, wherein the QWR comprises a quarter wave film, a quarter wave coating or a quarter wave plate.

8. The system of claim 1, wherein the first linear polarization state comprises P polarization, and the second linear polarization state comprises S polarization.

9. The system of claim 1, wherein the first linear polarization state comprises S polarization, and the second linear polarization state comprises P polarization.

10. The system of claim 1, wherein the optical waveguide is configured to cause at least a portion of light corresponding to an image, that is diffracted into the optical waveguide by the input diffraction grating, to travel by way of total internal reflection (TIR) to the output coupler where the portion of the light corresponding to the image is coupled out of the optical waveguide.

11. A method, comprising:
producing an image using a reflective microdisplay;
directing linearly polarized light corresponding to the image towards an input diffraction grating of an optical waveguide, the linearly polarized light having a first linear polarization state;
using a quarter wave retarder (QWR) to change the linearly polarized light corresponding to the image to circularly polarized light so that the light corresponding to the image that is diffracted into the optical waveguide by the input diffraction grating is circularly polarized;
using the optical waveguide to internally reflect a portion of the circularly polarized light corresponding to the image from the input diffraction grating to an output coupler of the optical waveguide where the portion of the light corresponding to the image is coupled out of the waveguide; and
using the QWR to change a further portion of the light corresponding to the image, which after being diffracted into the optical waveguide by the input diffraction grating is diffracted out of the optical waveguide by the input diffraction grating, from circularly polarized light to linearly polarized light having a second linear polarization state that is orthogonal to the first linear polarization state.

12. The method of claim 11, further comprising:
preventing the further portion of the light corresponding to the image, which has the second linear polarization state that is orthogonal to the first linear polarization state, and which is diffracted out of the optical waveguide by the input diffraction grating, from being reflected off the reflective microdisplay.

13. The method of claim 12, wherein:
the directing the linearly polarized light corresponding to the image towards the input diffraction grating of the optical waveguide is performed using a polarizing beam splitter (PBS); and
the preventing the further portion of the light corresponding to the image from being reflected off the reflective microdisplay is performed by using the PBS to reflect the further portion of the light corresponding to the image in a direction away from the reflective microdisplay.

14. The method of claim 12, wherein:
the directing the linearly polarized light corresponding to the image towards the input diffraction grating of the optical waveguide is performed using a polarizing beam splitter (PBS); and
the preventing the further portion of the light corresponding to the image from being reflected off the reflective microdisplay is performed using a linear polarizer that is configured to transmit light having the first linear polarization state and to absorb light having the second linear polarization state.

15. The method of claim 14, wherein:
the QWR is positioned between the PBS and the input diffraction grating of the optical waveguide; and
the linear polarizer is positioned between the PBS and the QWR.

16. A system, comprising:
a reflective microdisplay configured to produce an image;
a polarizing beam splitter (PBS);
an optical waveguide including an input diffraction grating and an output coupler;
the PBS positioned to cause linearly polarized light corresponding to the image and having a first linear polarization state to be directed toward the input diffraction grating of the optical waveguide;
a quarter-wave retarder (QWR) positioned between the PBS and the input diffraction grating of the optical waveguide so that linearly polarized light corresponding to the image and having the first linear polarization state, which is directed toward the input diffraction grating of the optical waveguide, is converted to circularly polarized light before being diffracted into the waveguide by the input diffraction grating of the optical waveguide; and
the optical waveguide configured to cause at least a portion of the circularly polarized light corresponding to the image, that is diffracted into the waveguide by the input diffraction grating, to travel by way of total internal reflection (TIR) to the output coupler where the portion of the light corresponding to the image is coupled out of the waveguide;
wherein the QWR, which is positioned between the PBS and the input diffraction grating, will change from circularly polarized light to linearly polarized light having the second linear polarization state that is orthogonal to the first linear polarization state, a further portion of the circularly polarized light corresponding to the image that after being diffracted into the optical waveguide by the input diffraction grating is diffracted out of the optical waveguide by the input diffraction grating.

17. The system of claim 16, wherein:

the PBS will reflect, in a direction away from the reflective microdisplay, light corresponding to the image that after being diffracted out of the optical waveguide by the input diffraction grating is converted by the QWR from circularly polarized light to linearly polarized light having the second linear polarization state that is orthogonal to the first linear polarization state, thereby preventing a ghost image that may otherwise occur due to the diffracted out light.

18. The system of claim 16, further comprising:

a linear polarizer positioned between the PBS and the QWR and configured to transmit light having the first linear polarization state and absorb light having the second linear polarization state that is orthogonal to the first linear polarization state;

wherein the linear polarizer will transmit the light corresponding to the image and having the first linear polarization state, that is directed toward the input diffraction grating of the optical waveguide, before the light corresponding to the image and having the first linear polarization state reaches the QWR; and wherein the linear polarizer will absorb light corresponding to the image that after being diffracted out of the optical waveguide by the input diffraction grating is converted by the QWR from circularly polarized light to linearly polarized light having the second linear polarization state that is orthogonal to the first linear polarization state, thereby preventing a ghost image that may otherwise occur due to the diffracted out light.

19. The system of claim 16, wherein the reflective microdisplay comprises a liquid crystal on silicon (LCoS) microdisplay.

20. The system of claim 16, wherein the first linear polarization state comprises P polarization, and the second linear polarization state comprises S polarization.

* * * * *